No. 887,409. PATENTED MAY 12, 1908.
T. C. MASON.
BURNING OIL FOR GENERATING HEAT.
APPLICATION FILED JULY 5, 1907.
2 SHEETS—SHEET 1.
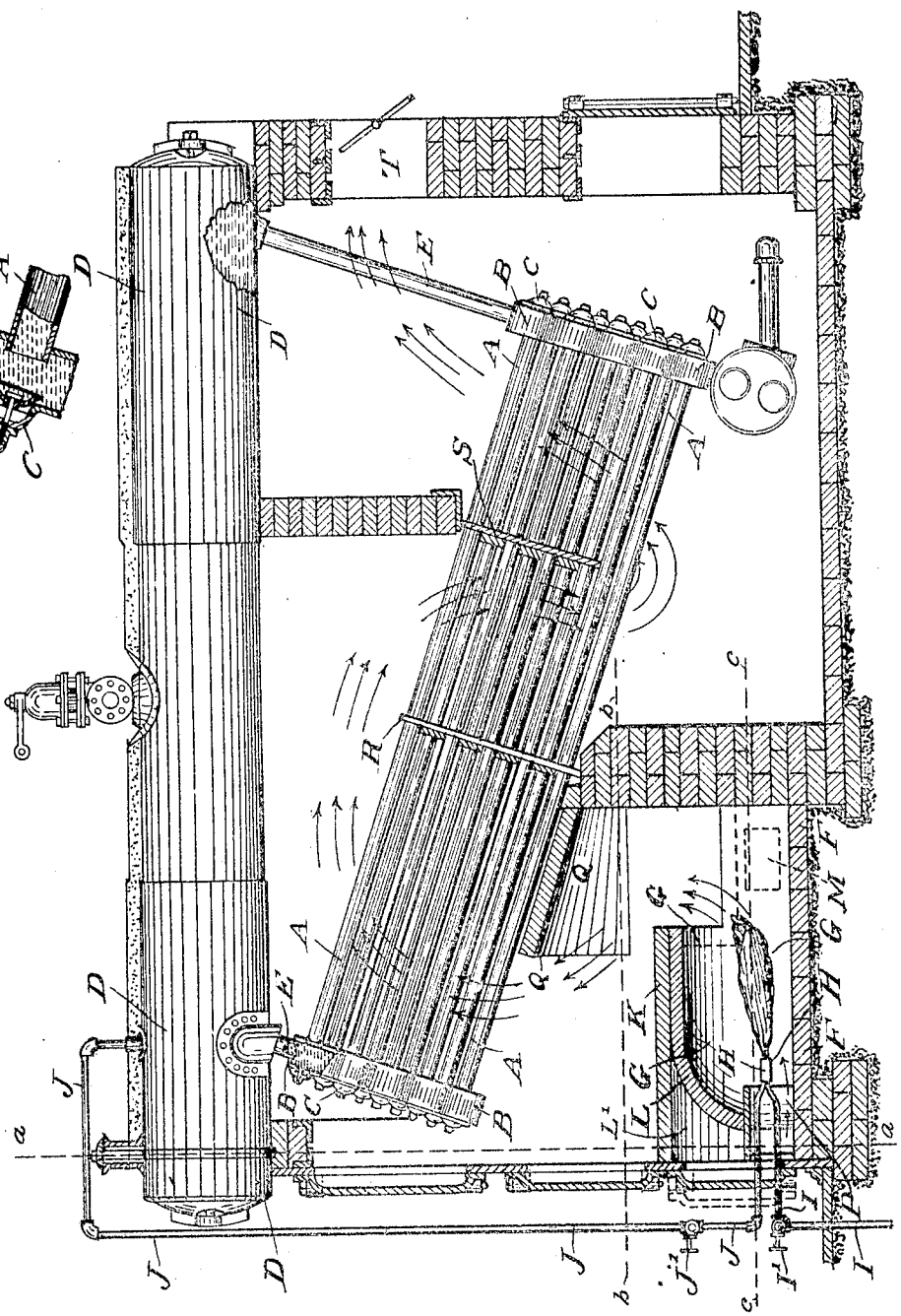
Witnesses:
R. S. Berry
Ida M. Haskam.
Inventor
Thomas C. Mason
By St. John Day
Attorney.

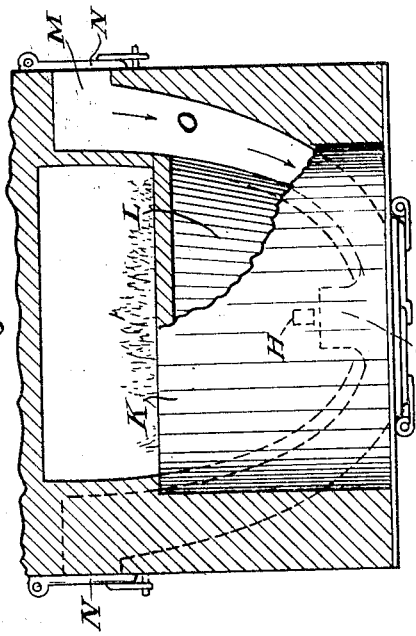
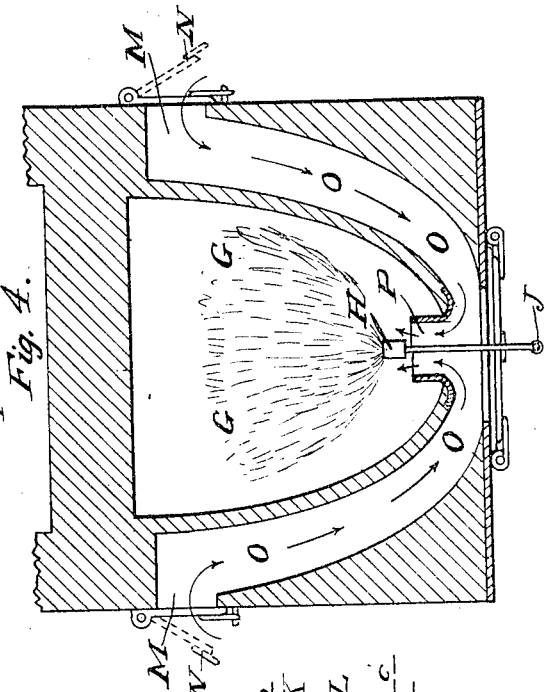
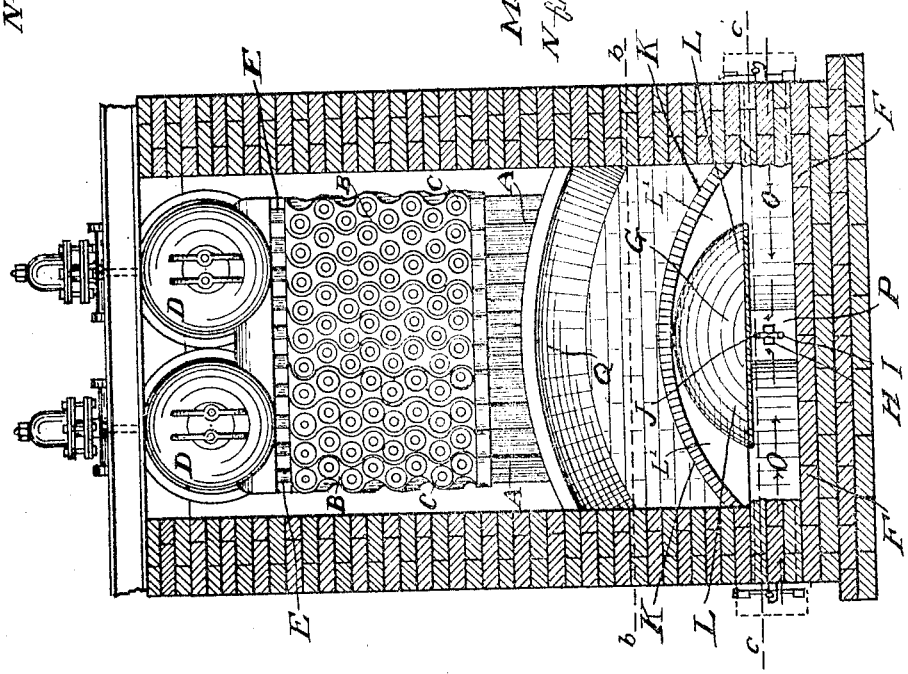

UNITED STATES PATENT OFFICE.

THOMAS C. MASON, OF LOS ANGELES, CALIFORNIA, ASSIGNOR, BY DIRECT AND MESNE ASSIGNMENTS, TO MASON SMOKELESS COMBUSTION COMPANY, INCORPORATED.

BURNING OIL FOR GENERATING HEAT.

No. 887,409.   Specification of Letters Patent.   Patented May 12, 1908.

Application filed July 5, 1907. Serial No. 382,367.

*To all whom it may concern:*

Be it known that I, THOMAS C. MASON, of the city of Los Angeles, in the county of Los Angeles, in the State of California, have invented certain new and useful Improvements for Burning Oil for Generating Heat, of which the following is a full, clear, and exact specification, reference being had to the annexed drawings and to the figures and letters marked thereon.

The improvements constituting my present invention are more especially applicable to that class of externally fired boilers which constitute what is known as water tube or tubulous, as distinguished from tubular boilers, of which there are several types, some of the best known types being the Babcock and Wilcox boilers, and the Sinclair boiler, in all of which the water from which the steam is to be generated is contained within closed tubes having end connections or passages leading to an upper horizontal larger tube partly filled with water, and wherein the steam generated is contained.

Upon the annexed drawings Figure 1, is a view partly in section and partly in elevation, showing a Babcock and Wilcox boiler with the improvements constituting my invention applied thereto. Fig. 2, is a transverse section upon the line *a, a,* Fig. 1. Fig. 3, is a horizontal section partly in plan, showing the arrangement of the combustion chamber, the flues, and arches of the device constituting my present improvements, the sectional parts being taken on the line *b, b,* Fig. 2. Fig. 4, is a horizontal section showing the air inlets, the flues of gradually contracting cross sectional area, and the discharge flue leading to the burner of the apparatus on the line *c, c,* Fig. 2. Fig. 5, is an enlarged detail view showing on a larger scale than in Fig. 1, the construction of the parts whereby the inclined tubes are connected to the upper horizontal portion of the boiler, and the manner whereby the tubular holes of the upper end of the connecting pieces are plugged.

In Figs. 1, and 2, of the drawings, the portion marked A, represents the inclined water tubes of a Babcock and Wilcox boiler. These water tubes A, are each held tightly into the inclined end casings B, B, (commonly designated headers) and the outer holes of these end casings B, B, are each closed by a cap C, and plug, constructed in the manner shown in the enlarged view Fig. 5. The inclined tubulous portion of the boiler consisting of the water tubes A, the end portions B, are connected to the upper horizontal members D, by the inclined passages E, as shown in Figs. 1, and 2. The apparatus constituting my invention is shown as occupying the position ordinarily occupied by the fire grate, fuel and fire commonly used, in the apparatus commonly used. This apparatus according to my present invention, and as shown in Figs. 1, 2, 3, and 4, consists of a brick or fire clay floor F, which extends completely across the brick casing of the structure as shown at Figs. 1, and 2, and forms the bottom of the combustion chamber, and the air heating flues as hereinafter described. The combustion chamber is marked G, and towards the front end the oil burner H, is situated. This burner H, is connected by the pipe I, with a tank or other source of supply of mineral oil; while the burner H, is also supplied with the requisite quantity of steam by the pipe J, from the steam space of the upper horizontal part of the boiler D. Each of the pipes I, and J, are supplied with valves I', and J', respectively, for the purpose of admitting of the cutting off the supply of oil and steam to the burner H, and for regulating the quantity of oil and steam supplied thereto. The combustion chamber G, consists of the inner or lower arch L, as shown at Figs. 1, and 2, more especially, and above the arch L, constituting the combustion chamber G, there is a second arch K, which extends from side to side of the boiler setting as shown at Figs. 2, and 3. The spaces L', between the arches L, and K, constitute portions of the air flues into which air passes from the openings M, one at each side of the boiler setting as shown in dotted lines in Figs. 1, and 2, and in full lines at one side of Fig. 3, and on both sides of Fig. 4. These openings M, are provided with pivoted doors N, which on being partly opened as shown at Fig. 4, regulate the quantity of air which is admitted into the flues O, at either side of the structure; the direction of movement of the air being indicated by the arrows in Figs. 3, and 4, more especially, and showing the gradual diminution of the cross sectional area of the flues as they approach the discharge flue P, by which the heated air is conveyed to the gases and vapors issuing from the oil and steam conveyed to the burner H, by the pipes I, and J, as hereinbefore described.

It will be observed that while the entrances for the air to be heated are situated at the sides of the brick setting of the boiler, the flues are partly in that brick setting, and partly situated between the arch L, of the combustion chamber G, and the arch K, so that a considerable heating surface for the air is by this construction provided, thereby insuring its being in a highly heated condition when it reaches the discharge flue P.

The flame and products of combustion from the burner H, issue as shown at Figs. 1, and 4, in a blow-pipe like flame of great intensity of heat, which is discharged upwards as shown by the arrows in Fig. 1, so as to strike against the arch Q, whereby the heat is prevented from being immediately passed among those portions of the water tubes A, immediately above the arch Q, the heat and products of combustion being compelled by the arch Q, to pass further forwards towards the front of the boiler, before they ascend up among the tubes A, thereby discharging the products of combustion and heat at the highest temperature against those portions of the tubes A, which are situated towards the front end of the boiler. The heated products of combustion after having passed among this portion of the tubes of the boiler then proceed in the direction of the arrows shown in Fig. 1, downwards over and among the next division of tubes beyond the partition R, and return again upwards as indicated by the arrows beyond the partition S, to the flue T, to a chimney or discharge stack, not shown in the drawings.

It is also to be understood that in the application of my invention that various modifications and changes may be made therein without departing from the spirit of my said invention, and without exceeding the scope of my claims.

I claim as my invention.

The apparatus for burning oil for generating heat, consisting of a combustion chamber, an arch therein, an externally fired steam boiler, a burner whereinto oil and steam are led in regulated quantity, situated within and near the inner end of said combustion chamber, flues one at each side of the apparatus, openings for admitting air into said flues, doors on said openings for regulating the quantity of air admitted, an arch above the arch of the combustion chamber, inclosing spaces forming parts of the flues, these flues leading into a transverse flue, and a discharge flue, from which the heated air is discharged both beneath and above the burner, an upwardly inclined arch at the rear part of the apparatus and at a higher level than the combustion chamber, for directing the heat and products of combustion up among the upper ends of the inclined tubes of the externally fired steam boiler, substantially as set forth.

In testimony whereof, I have hereunto set my hand and seal at the city of Los Angeles aforesaid, in the presence of two subscribing witnesses.

THOMAS C. MASON. [L. S.]

Witnesses:
ST. JOHN DAY,
J. D. CORY.